No. 715,748. Patented Dec. 16, 1902.
P. BOESSNECK.
PROCESS OF MAKING ACETIC ACID.
(Application filed Jan. 22, 1900.)
(No Model.) 2 Sheets—Sheet 1.

Witnesses:
C. Brett.
R. E. Rogers.

Inventor:
Paul Boessneck
by Fairfax & Hetter
Attorneys

No. 715,748. Patented Dec. 16, 1902.
P. BOESSNECK.
PROCESS OF MAKING ACETIC ACID.
(Application filed Jan. 22, 1900.)

(No Model.) 2 Sheets—Sheet 2.

Witnesses:
C. Brett
R. E. Rogers.

Inventor:
Paul Boessneck
by Fairfax & Wetter
Attorneys

UNITED STATES PATENT OFFICE.

PAUL BOESSNECK, OF GLAUCHAU, GERMANY.

PROCESS OF MAKING ACETIC ACID.

SPECIFICATION forming part of Letters Patent No. 715,748, dated December 16, 1902.

Application filed January 22, 1900. Serial No. 2,383. (No specimens.)

*To all whom it may concern:*

Be it known that I, PAUL BOESSNECK, a subject of the German Emperor, residing at Glauchau, in the Kingdom of Saxony, Germany, have invented a certain new and useful Improvement in the Manufacture of Acetic Acid, of which the following is a clear and exact specification.

This invention relates to the distillation of acetic acid from mixtures containing the same in a free condition.

Commercial acetic acid is usually obtained by distilling pyrolignite of lime or other acetates with a strong mineral acid, such as sulfuric or hydrochloric acid, in retorts of iron or copper. The process is always carried out intermittently—that is to say, after the acetic acid contained in the charge has been driven out by the hydrochloric or sulfuric acid, and when the apparatus is being charged afresh the distillation of the acetic acid is interrupted.

As far as I have been able to ascertain, the distillation of acetic acid from acetates is not carried out uninterruptedly anywhere, nor has such a process been described in the technical literature. I have found, however, that the continuous manufacture of commercial acetic acid by distilling acetates with acid on the reflux principle constitutes an important progress by enhancing the capacity of production of the manufacturing plant and reducing the cost of manufacture.

The most suitable raw material for the manufacture of acetic acid from acetates and a strong mineral acid is a mixture of acetate of lime and hydrochloric acid, because the residue resulting from the distillation of such a mixture is a concentrated calcium-chlorid solution which can be easily kept liquid.

Various systems of apparatus may be employed for the continuous distillation of acetic acid according to my invention. For instance, the most suitable appliances are those constructed on the principle of column-stills, as illustrated by the accompanying drawings, the mixture of acid and calcium acetate or pyrolignite being charged in the top ring, while the residue, relieved of acetic acid, escapes at the bottom.

Figure 1:
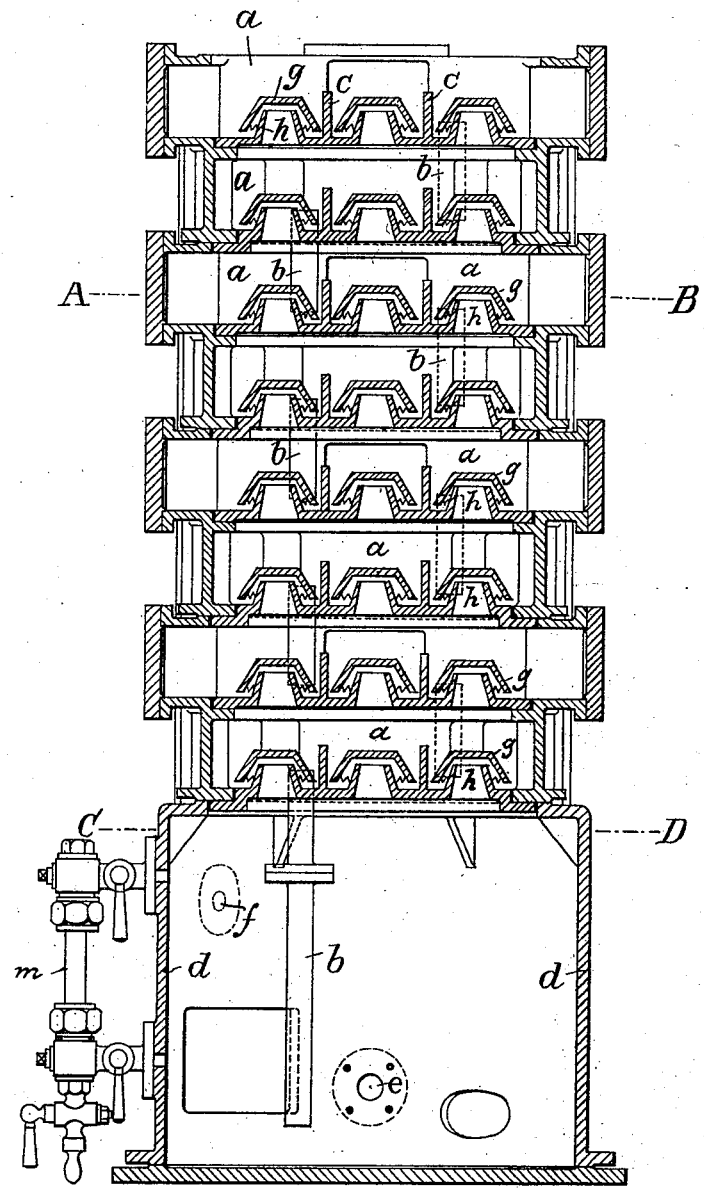
Figure 2:
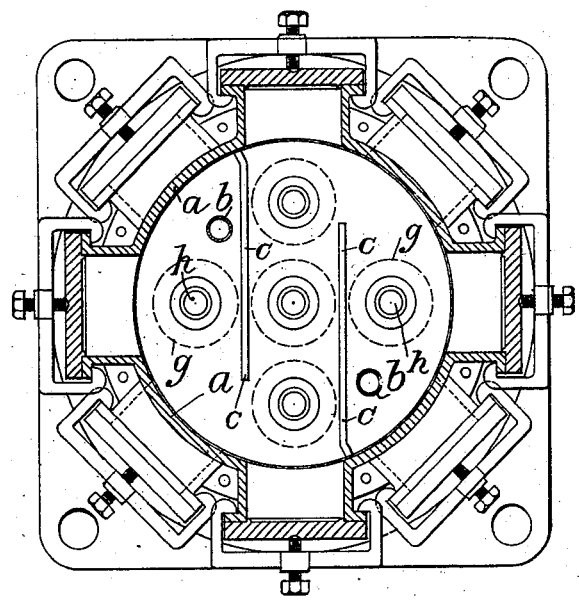
Figure 3:
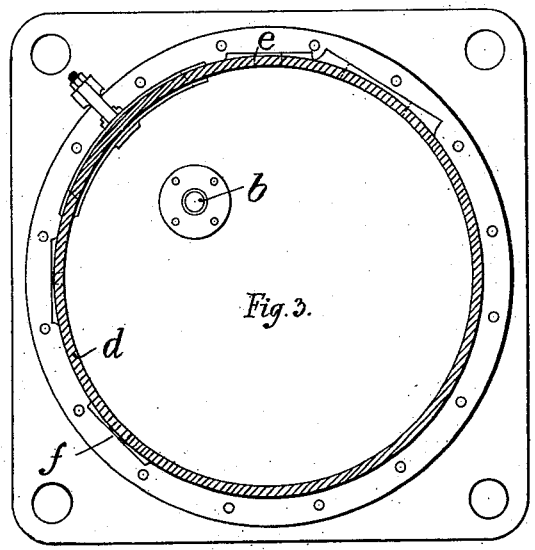

In the drawings, Figure 1 is a vertical section of a column-still embodying my invention. Fig. 2 is a horizontal section of the same along line A B, and Fig. 3 a section along line C D of Fig. 1.

As mentioned above, the apparatus is constructed on the reflux principle—that is to say, the mixture of hydrochloric acid and acetate or pyrolignite of lime travels through the apparatus in a direction opposite to that of the heating medium, which preferably consists of steam, (either saturated or superheated,) although other elastic fluids, such as hot air or hot gases, may be used.

The apparatus chiefly comprises a series of evaporating-dishes or shallow vessels $a$, placed one above the other and communicating with each other through tubes $b$, placed alternately on diametically opposite sides, as indicated by Fig. 2, and also through openings $h$, formed in the floor of each vessel, each opening extending through a conical elevation and being covered by a conical hood $g$. The floor of each vessel $a$ has also a pair of upright ribs or deflecting-plates $c$, which force the liquid poured into the said vessel to take a zigzag course in flowing from one side of the vessel to the other.

The stack of evaporating vessels $a$ is mounted on a box or hollow stand $d$, having an inlet $f$ for steam and an outlet $e$ for liquid and which is provided with a water-gage $i$.

The mixture of pyrolignite of lime and hydrochloric acid to be treated in the apparatus is caused to flow into the uppermost of the dishes $a$, through which it is guided by the ribs $c$ and in which it rises to the upper edge of the down-pipe $b$, situated below the mouth of the conical openings $h$. Through the pipe $b$ the liquid flows into the second dish $a$, thence into the third, and so on until it reaches the hollow stand $d$, from which it escapes through the outlet $e$. At the same time superheated steam admitted through the opening $f$ to the hollow stand $d$ rises into the lowest of the evaporating vessels through the conical openings $h$, situated in the bottom of the same, and passes through the layer of liquid lying on the bottom of the said vessel, whereby the steam is charged with acetic acid. Subsequently the steam rises into the next higher evaporating vessel through the conical openings in the bottom of the same and is further enriched with acetic-acid vapors by its contact with the liquid situated in the said vessel. In this manner the steam rises from one vessel to another until it reaches the topmost vessel *a* after it has been gradually enriched with acetic acid. From the topmost vessel the mixture of acetic acid and steam is led off into a condenser, where the acetic acid is recovered in the known manner.

What I claim is—

1. The process for obtaining acetic acid from a mixture of an acetate with a strong mineral acid, which consists in supplying the said mixture continuously to the first of a series of liquid-receptacles, causing it to pass through the said receptacles continuously one after another, and discharging it from the last, and at the same time causing a continuous supply of hot elastic fluid to pass through the said series of liquid-receptacles one after another in the order and direction opposite to that of the liquid flow, substantially as described and for the purpose specified.

2. The process for obtaining acetic acid from a mixture of an acetate with a strong mineral acid, which consists in supplying the said mixture continuously to the first of a series of liquid-receptacles, causing it to pass through the said receptacles continuously one after another, and discharging it from the last and at the same time causing a continuous supply of hot elastic fluid to pass through the said series of liquid-receptacles one after another in the order and direction opposite to that of the liquid flow, in order to heat the same and to gradually absorb the acetic acid given off in its course and treating the heating fluid discharged from the series of receptacles in the known manner for recovering the acetic acid absorbed by the same, substantially as described.

3. The process for obtaining acetic acid from a liquid mixture of calcium pyrolignite and hydrochloric acid, which consists in supplying the said mixture continuously to the first of a series of liquid-receptacles, causing it to pass through the said receptacles continuously one after the other, and discharging it from the last and at the same time causing a continuous supply of hot elastic fluid to pass through the said series of liquid-receptacles one after another in the order and direction opposite to that of the liquid flow, in order to heat the same and to gradually absorb the acetic acid given off in its course and treating the heating fluid discharged from the series of receptacles in the known manner for recovering the acetic acid absorbed by the same, substantially as described.

4. The process for obtaining acetic acid from a liquid mixture of calcium pyrolignite and hydrochloric acid, which consists in supplying the said mixture continuously to the first of a series of liquid-receptacles, causing it to pass through the said receptacles continuously one after another, and discharging it from the last, and at the same time causing a continuous supply of steam to pass through the said series of liquid-receptacles one after another in the order and direction opposite to that of the liquid flow, in order to heat the same and to gradually absorb the acetic acid given off in its course and subsequently recovering the acetic acid from the steam by condensation, substantially as described.

5. The process for obtaining acetic acid from a liquid mixture of calcium pyrolignite and hydrochloric acid, which consists in continuously supplying such mixture to the first and uppermost of a series of liquid-receptacles forming a column-still, causing it to flow through the said series of receptacles continuously one after another and discharging it from the last, and at the same time causing a continuous supply of steam to ascend through the said series of receptacles one after another, so as to keep in contact with the descending liquid throughout the length of the column, and to gradually absorb the acetic-acid vapor arising from the same, substantially as described.

In witness whereof I have hereunto set my hand in the presence of two subscribing witnesses.

PAUL BOESSNECK.

Witnesses:
MARY L. SAWTER,
KLARA HAMMER.